United States Patent
Moradians et al.

(10) Patent No.: US 8,585,334 B2
(45) Date of Patent: Nov. 19, 2013

(54) ATTENUATING CARGO RESTRAINT DEVICE

(75) Inventors: Edward Moradians, Woodland Hills, CA (US); John F. Rowles, Fullerton, CA (US)

(73) Assignee: Ancra International LLC, Azusa, CA (US)

(*) Notice: Subject to any disclaimer, the term of this patent is extended or adjusted under 35 U.S.C. 154(b) by 44 days.

(21) Appl. No.: 13/463,610

(22) Filed: May 3, 2012

(65) Prior Publication Data
US 2013/0259593 A1    Oct. 3, 2013

Related U.S. Application Data

(60) Provisional application No. 61/619,842, filed on Apr. 3, 2012.

(51) Int. Cl.
*B60P 7/08* (2006.01)
(52) U.S. Cl.
USPC ............... 410/80; 410/69; 410/92; 410/94
(58) Field of Classification Search
USPC ............... 410/69, 77, 80, 92, 94; 414/536; 244/118.1, 137.1; 248/503
See application file for complete search history.

(56) References Cited

U.S. PATENT DOCUMENTS

| | | | |
|---|---|---|---|
| 3,641,940 A | 2/1972 | Evans | |
| 4,134,345 A | 1/1979 | Baldwin et al. | |
| 5,000,635 A | 3/1991 | Jensen et al. | |
| 5,011,348 A | 4/1991 | Jensen et al. | |
| 5,310,297 A | 5/1994 | Benjamin | |
| 5,564,654 A | 10/1996 | Nordstrom | |
| 6,413,029 B1 * | 7/2002 | Kernkamp | 410/79 |
| 7,922,431 B2 | 4/2011 | Schulze et al. | |
| 7,988,391 B2 | 8/2011 | Schulze | |
| 2010/0209209 A1 | 8/2010 | Schulze | |

* cited by examiner

Primary Examiner — Stephen Gordon
(74) Attorney, Agent, or Firm — Brinks Gilson & Lione

(57) ABSTRACT

Some embodiments provide an attenuating cargo restraint device that mounts within the plan-view envelope of the cargo being restrained and that does not extend outboard beyond an allowable amount of attenuation. The device includes a sliding head assembly that can be movably disposed relative to a base. The head assembly includes a cavity covered by an upper housing with the upper housing extending inboard and below a point at which the cargo is restrained. The base includes a complimentary cavity extending inboard from a distal end to a proximal end of the base. These cavities collectively form a housing that incorporates and accommodates the elastic element of the device wholly within the innards of the device, below the point of engagement with cargo, and inboard from the point of engagement so as to locate the elastic element underneath and within the plan-view envelope of the cargo being restrained.

19 Claims, 10 Drawing Sheets

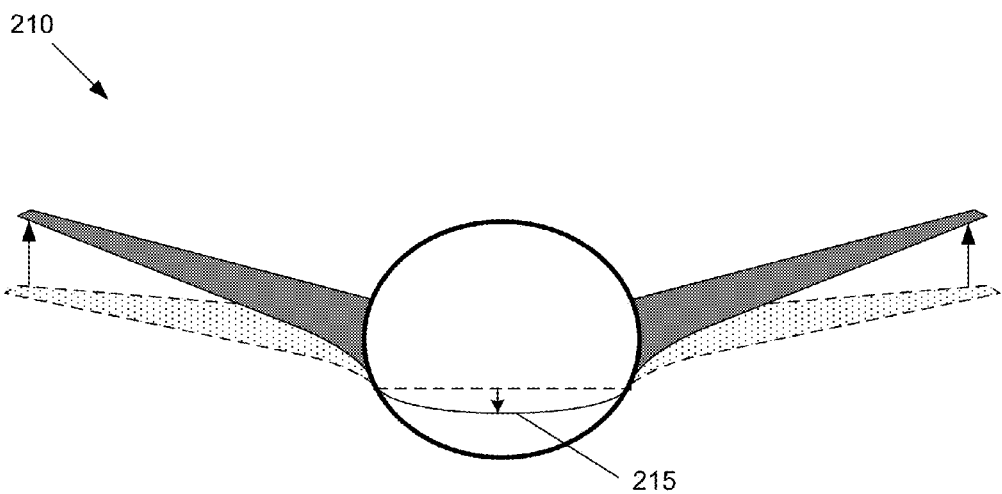
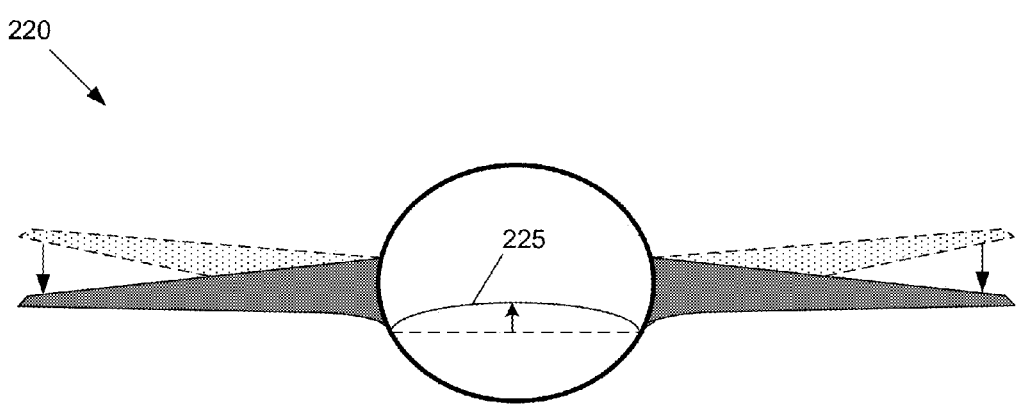
**Figure 2
Prior Art**

Figure 7
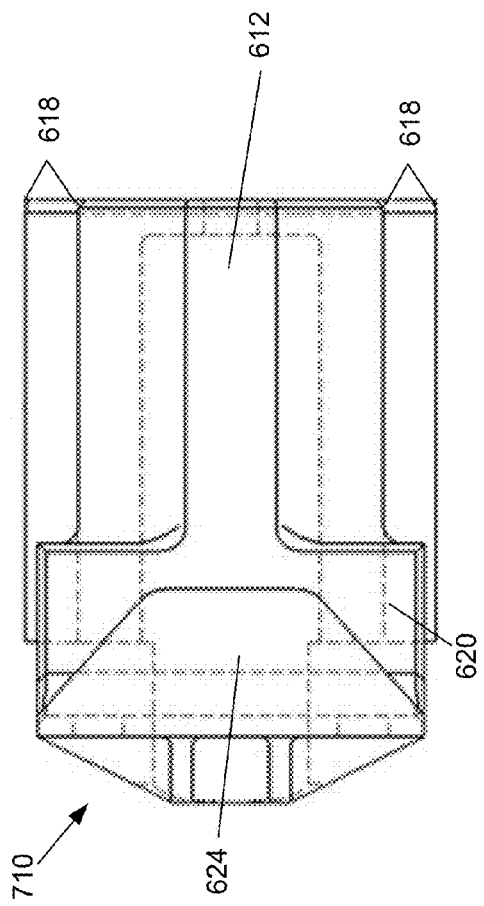
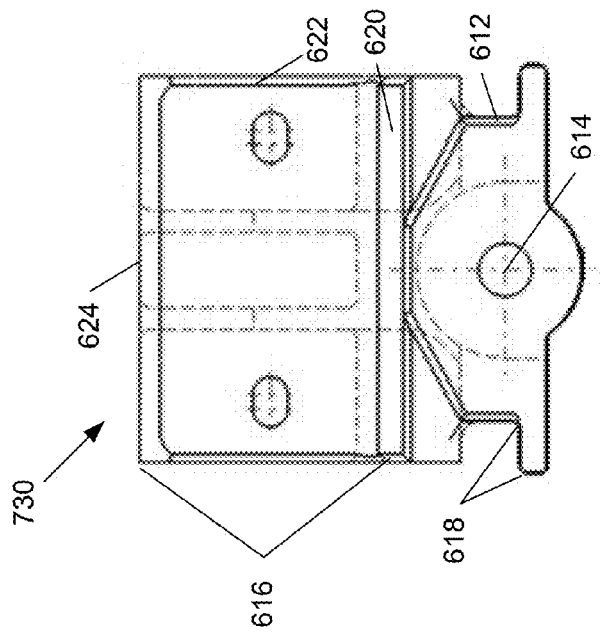
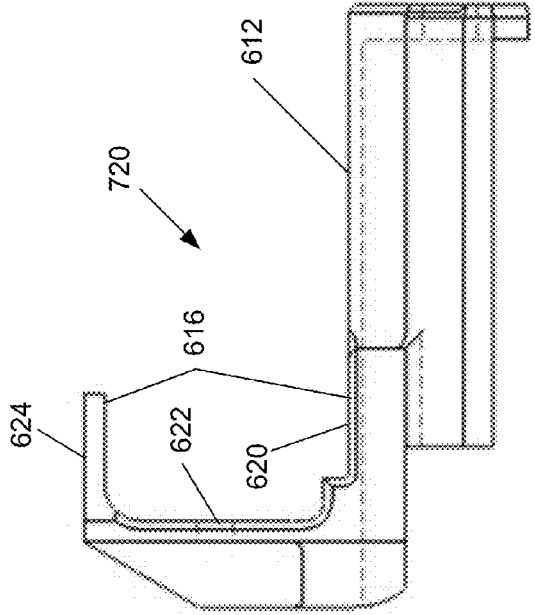

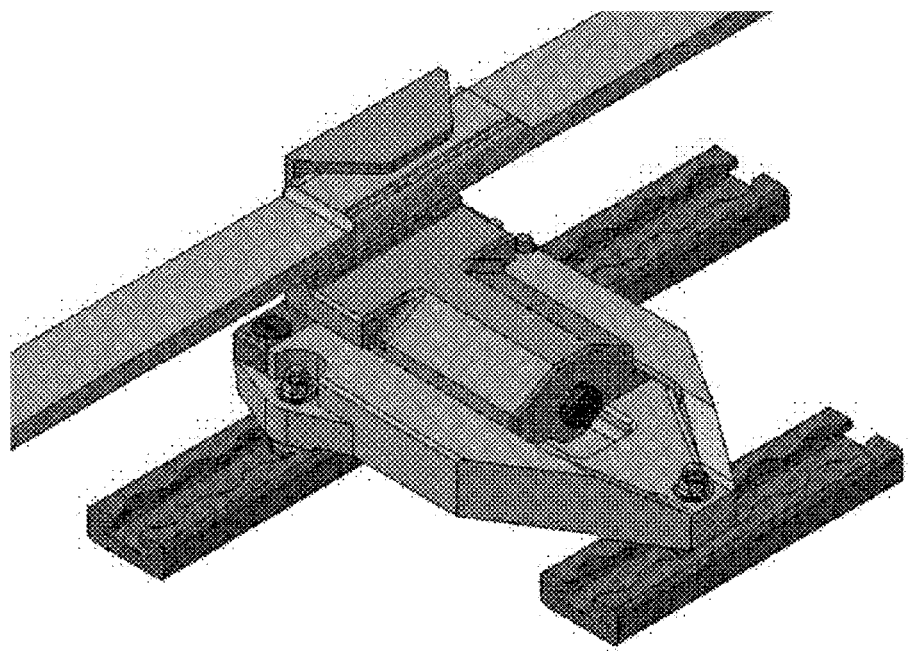
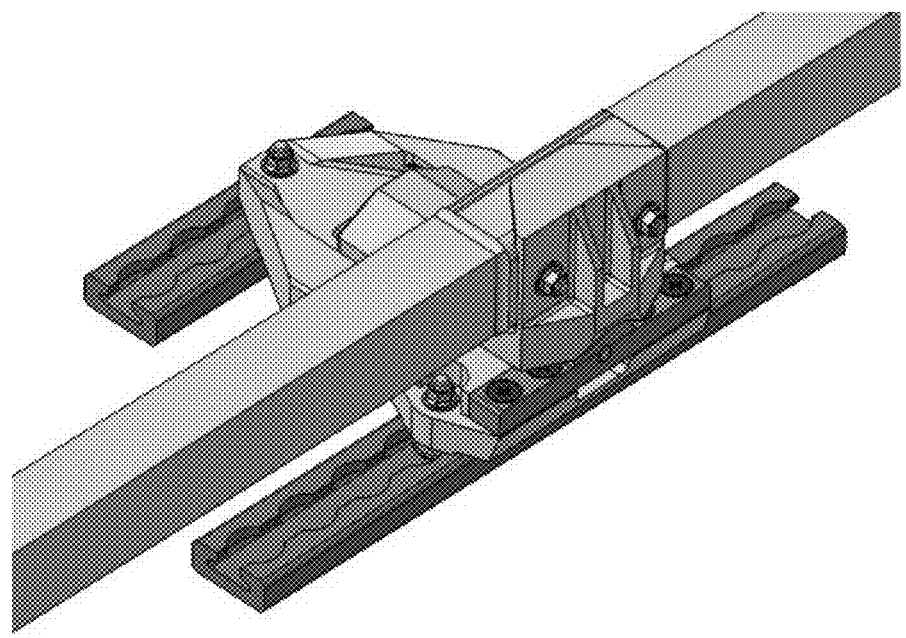
Figure 9

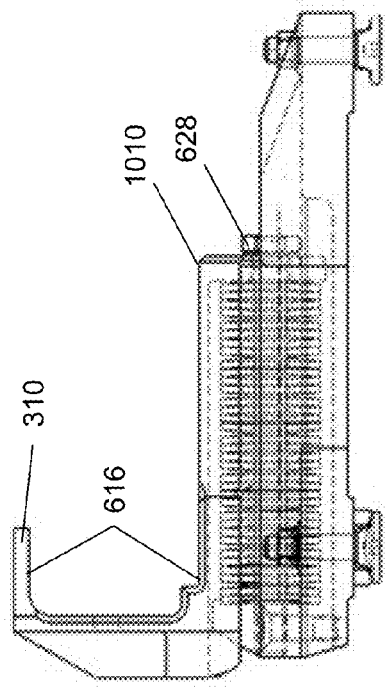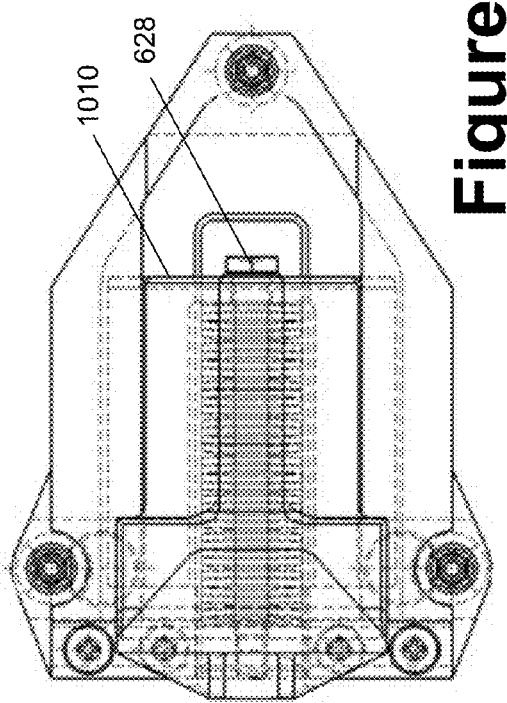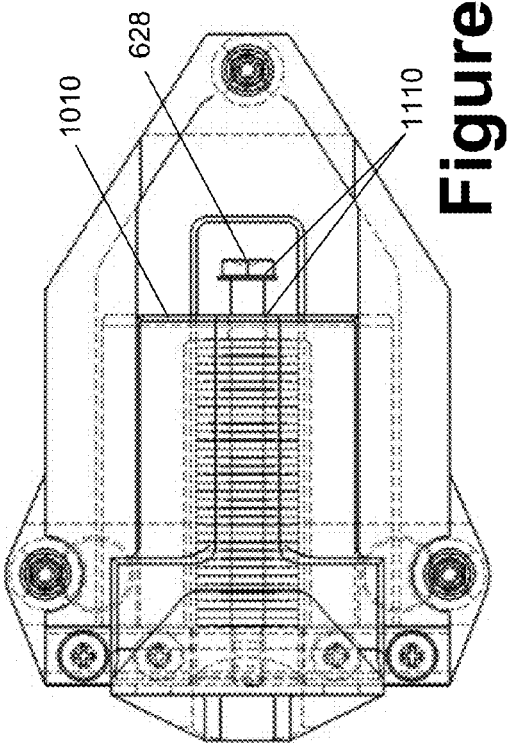
Figure 10
Figure 11

ATTENUATING CARGO RESTRAINT DEVICE

CLAIM OF BENEFIT TO RELATED APPLICATION

This application claims the benefit of U.S. provisional application 61/619,842, entitled "Attenuating Cargo Restraint Device", filed Apr. 3, 2012. The contents of the provisional application 61/619,842 are hereby incorporated by reference.

TECHNICAL FIELD

The present invention relates to cargo restraint devices and, more specifically, to an attenuating restraining device that maintains engagement while compensating for flexion in the structure of aircraft.

BACKGROUND ART

Cargo restraints prevent cargo containing unit load devices (ULDs) such as pallets and containers from moving during transport. This ensures that the goods that are contained in the ULDs arrive at their intended destinations undamaged. Also, by preventing the movement of the ULDs during transport, the restraints ensure that the ULDs do not contact and thereby cause damage to the hull of the transport vehicle.

Typical cargo restraints are stationary and provide no biasing or movement. This is because the restraints must endure the high loads and forces exerted by the ULDs being restrained. Accordingly, most restraints of the prior art are designed as fixed structures offering no flex when configured to restrain a ULD.

Cargo restraints are set in position relative to the cargo compartment of the transport vehicle. The position of the cargo restraints in the cargo compartment is set by coupling the cargo restraints to one or more tracks that line the deck of the cargo compartment. Various standardized tracks, such as a "seat track", may be used to set the position of the cargo restraints within the cargo compartment of the transport vehicle. The tracks allow the positions of the cargo restraints to be set to accommodate ULDs of different sizes and dimensions. The cargo restraints can be repositioned by manually uncoupling the restraints from the track and recoupling the restraints to a different position on the track.

FIG. 1 illustrates a common configuration for a cargo compartment of an airplane from a top view. As shown, the deck 110 of the cargo compartment is lined with rollers 120 and tracks 130 and 140.

The rollers 120 include lateral oriented rollers and longitudinal oriented rollers. Alternatively, the rollers 120 may include swiveling rollers that can be oriented either laterally or longitudinally as needed. The rollers 120 can be positioned in between the tracks or are attachments that are coupled to the tracks. The rollers 120 eliminate much of the friction between the bottom of the ULDs and the deck 110 of the cargo compartment, thereby allowing ULDs to be repositioned with less force.

One or more centerline tracks 130 are located towards the center of the cargo compartment. One or more side tracks 140 are located towards either sidewall of the cargo compartment. Each track includes alternating open and closed fittings (e.g., open fitting 170 and closed fitting 175). The open fittings are sized to accept studs or other mounting hardware of the restraints 150. The studs are inserted into the open fittings at desired locations along the tracks 130 and 140. The positions of the restraints 150 are then secured by sliding the restraints 150 such that the studs are aligned with the closed fittings instead of the open fittings. Each cargo restraint 150 contains a flange that engages a ULD 160 to prevent the ULD 160 from movement during transport.

Typical cargo restraints are deficient in aircraft transport because of the cargo compartment distortion phenomenon that occurs primarily within the wing box of the airplane. The distortion results from the flexion of the airplane's wings during flight or other movement (e.g., taxiing down a runway). As shown at 210 in FIG. 2, upward flexion of the airplane's wings causes concave distortion 215 to the deck of the cargo compartment on which the ULDs are loaded. As shown at 220 in FIG. 2, downward flexion of the airplane's wings causes convex distortion 225 to the deck of the cargo compartment on which the ULDs are loaded. The amount of distortion varies on hull design, structural materials, and outside forces such as turbulence which can exert greater forces on the wings to produce greater flexion and distortion.

The distortion alters the width of the cargo compartment deck. This distortion when coupled with fixed or stationary cargo restraints of the prior art can result in damage to the aircraft, ULDs, or goods contained within the ULDs. For example, when the distortion creates an expansion of the cargo compartment deck, the restraints may disengage from the ULDs, thereby allowing the ULDs and their contained goods to shift during transit. Alternatively, when the distortion creates a pinching of the cargo compartment deck, the loads of the ULDs become disproportionately distributed to the center of the cargo compartment deck. This can overload the center of the cargo compartment and cause fracturing or other damage to the cargo compartment deck. Distortion of the cargo compartment deck can also cause the cargo restraints to exert penetrating forces to the outer walls of the ULDs. Sufficient penetrating forces can damage the ULDs by breaching or bending the outer walls of the ULDs, thus impacting and damaging the goods contained therein.

Some attempts have been made to engineer attenuating cargo restraints to overcome the deficiencies of fixed or stationary cargo restraints. The attenuating cargo restraint is one such attempt. The attenuating cargo restraint remains stationary relative to the ULD being restrained, but moves relative to itself in order to mitigate the effects of the distortion to the deck of the cargo compartment to which the restraint is coupled. U.S. Pat. No. 7,988,391 describes one such attenuating cargo restraint. While overcoming some of the distortion effects, the described attenuating cargo restraint of U.S. Pat. No. 7,988,391 is limited in practical usage because of various design inefficiencies. Primarily, the described attenuating cargo restraint houses the elastic element (e.g., spring, coil, leaf-spring, etc.) behind the head assembly that engages a ULD. This design inefficiency necessitates an elongated base or frame that extends outboard from where the head assembly engages the ULD. Consequently, the attenuating cargo restraint requires a large distance buffer or clearance between where the restraint engages a ULD and where the restraint is coupled to a track. This design inefficiency prevents the attenuating cargo restraint from being mounted within the plan-view envelope of the cargo being restrained. This design inefficiency further prevents the restraint from use in various aircraft that have constrained outboard specifications or limited spacing between coupling location and an outer sidewall of the cargo compartment. Even when such an attenuating cargo restraint is usable, the outboard extension of the restraint results in lost space in the cargo compartment and thus, suboptimal usage of the available cargo capacity of the transport aircraft. Stated differently, payloads restrained by such an attenuating cargo restraint must be reduced or shrunk laterally in order to recover the width in the cargo compartment that is lost as a result of the outboard extension of the attenuating cargo restraint that extends beyond the head assembly engaging the ULD.

Accordingly, there is a need for a more compact and space efficient attenuating cargo restraint. Such an attenuating cargo restraint is needed to overcome the distortion effects occurring within the cargo compartment of aircraft without sacrificing payload capacity of the aircraft. In other words, the payload capacity of the aircraft cargo compartment and the size of the ULDs transported therein should not be compromised in order to accommodate the attenuating cargo restraint and the attenuating cargo restraint should mount completely within the plan-view envelope of the ULD being restrained.

SUMMARY OF THE INVENTION

Some embodiments set forth an attenuating cargo restraint device that mounts within the plan-view envelope of the cargo being restrained and that does not extend outboard beyond an allowable amount of biasing. To fit within the specified envelope, the device is designed to incorporate the elastic element below the cargo being restrained and in front or inboard from the point at which the device engages and restrains the cargo.

The attenuating cargo restraint device is comprised of a sliding head assembly that can be movably disposed relative to a base. The sliding of the head assembly relative to the base allows the device to continually restrain cargo while adjusting to displacement of the base, wherein such displacement may occur as a result of aircraft wing flexion (which can lead to distortion of the deck to which the base is mounted).

The head assembly includes a slide channel with a flange at a distal or outboard end of the head assembly for restraining pallets, containers, and other Unit Load Devices (ULDs). The head assembly further includes a cavity covered by an upper housing with the upper housing extending inboard from the base of the slide channel at a distal end of the head assembly to a proximal end of the head assembly. The upper housing also serves as a platform atop which restrained cargo is situated. The base includes a complimentary cavity extending inboard from a distal end of the base to a proximal end of the base. Ridges protruding from sides of the head assembly fit within recessed slits that are along the sidewalls of the inner cavity of the base to form a tongue-and-groove joint across which the head assembly can be biased relative to the base.

The cavities of the head assembly and the base collectively form a housing that incorporates and accommodates the elastic element of the device wholly within the innards of the device, below the point of engagement with cargo, and inboard from the point of engagement so as to locate the elastic element underneath and within the plan-view envelope of the cargo being restrained. This device is operable with any one or more elastic elements including a Belleville spring, torsion spring, leaf spring, coil, or other compressible material.

Such a design for the attenuating cargo restraint of some embodiments eliminates the need for a buffer or clearance behind the head assembly or distal end of the base that is more than the maximum amount of biasing that is provided by the restraint. This design optimally adapts the restraint for use in aircraft with constrained outboard specifications or limited spacing between the coupling location of the restraint and an outer sidewall of the cargo compartment.

BRIEF DESCRIPTION OF THE DRAWINGS

In order to achieve a better understanding of the nature of the present invention, preferred embodiments for the attenuating cargo restraint device will now be described, by way of example only, with reference to the accompanying drawings in which:

FIG. 2 illustrates distortion to a cargo compartment as a result of upward and downward flexion of the airplane's wings.

FIG. 7 provides a top view, side view, and front view of the head assembly in accordance with some embodiments.

FIG. 9 illustrates mounting the attenuating cargo restraint along a seat track using seat track studs as the floor mounting hardware.

FIG. 10 illustrates the attenuating cargo restraint at an unbiased position from the top view and side view.

FIG. 11 illustrates the head assembly of FIG. 10 being biased in the outboard direction.

DETAILED DESCRIPTION

In the following detailed description, numerous details, examples, and embodiments for the attenuating cargo restraint device are set forth and described. As one skilled in the art would understand in light of the present description, the device is not limited to the embodiments set forth, and the device may be practiced without some of the specific details and examples discussed. Also, reference is made to the accompanying figures, which illustrate specific embodiments in which the device can be practiced. It is to be understood that other embodiments can be used and structural changes can be made without departing from the scope of the embodiments herein described.

To facilitate the discussion that is to follow, the terms distal and proximal are provided a specific meaning when used to spatially identify locations of an object relative to a cargo compartment. The terms distal, distal end, or distal point refer to the "outboardmost" position of the object in relation to the cargo compartment. In other words, the distal end is the end of the object that is closest to the nearest sidewall of the cargo compartment. The terms proximal, proximal end, or proximal point refer to the "inboardmost" position of the object in relation to the cargo compartment. In other words, the proximal end is the end of the object that is closest to the center of the cargo compartment.

Also, the terms bias and biasing refer to displacement or deviation from a reference position. The reference position is the unbiased state or unbiased point.

A. Overview

Some embodiments provide an attenuating cargo restraint device that mounts within the plan-view envelope of the cargo being restrained and that continually restrains the cargo by moving to absorb distortion to the deck of the cargo compartment to which the restraint is coupled. More specifically, the attenuating cargo restraint device maintains its engagement with a Unit Load Device (ULD), such as a pallet or container, when the underlying deck of an airplane (to which the restraint is coupled) distorts as a result of wing flexion. Unlike attenuating cargo restraints of the prior art, this design does not compromise payload capacity of the cargo compartment and is usable in aircraft with constrained outboard specifications or limited spacing between coupling location and an outer sidewall of the cargo compartment.

Figure 1:
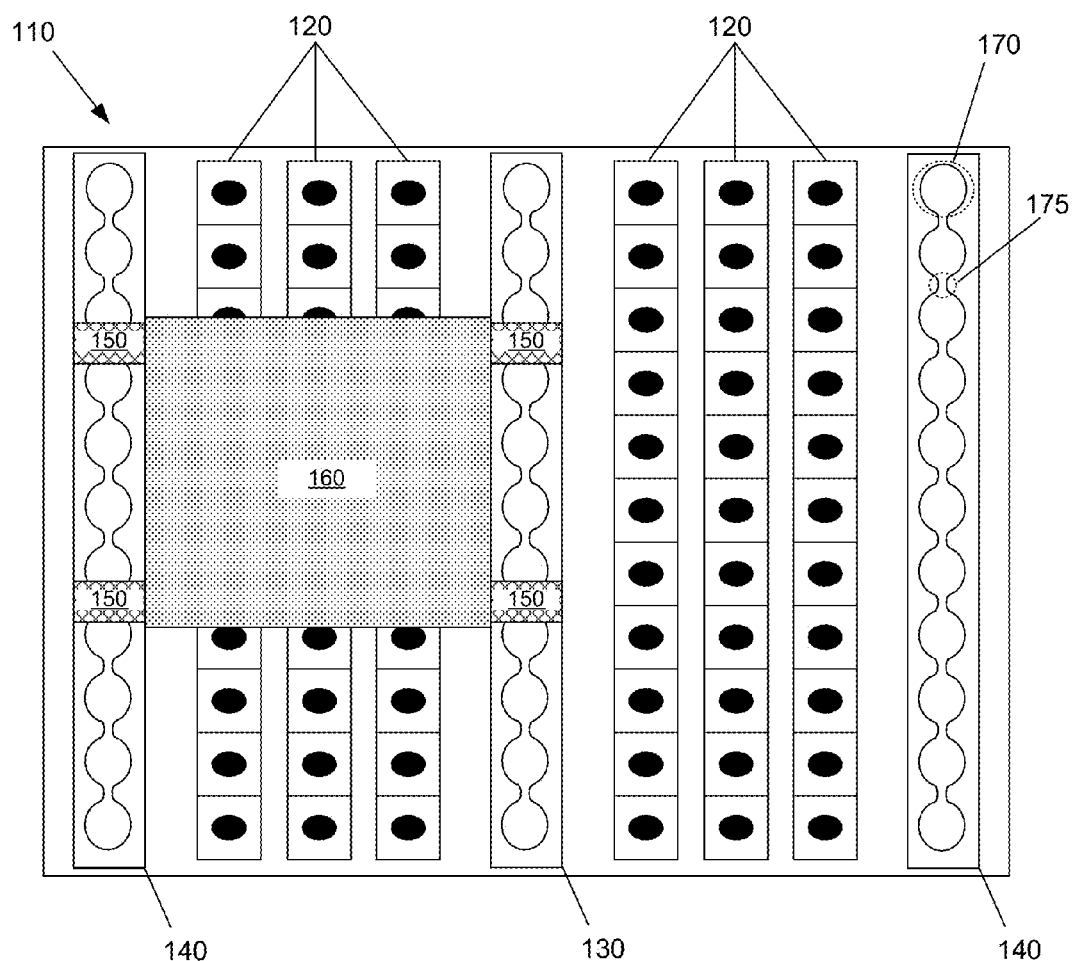
FIG. 1 illustrates a common configuration for a cargo compartment of an airplane from a top view.
Figure 3:
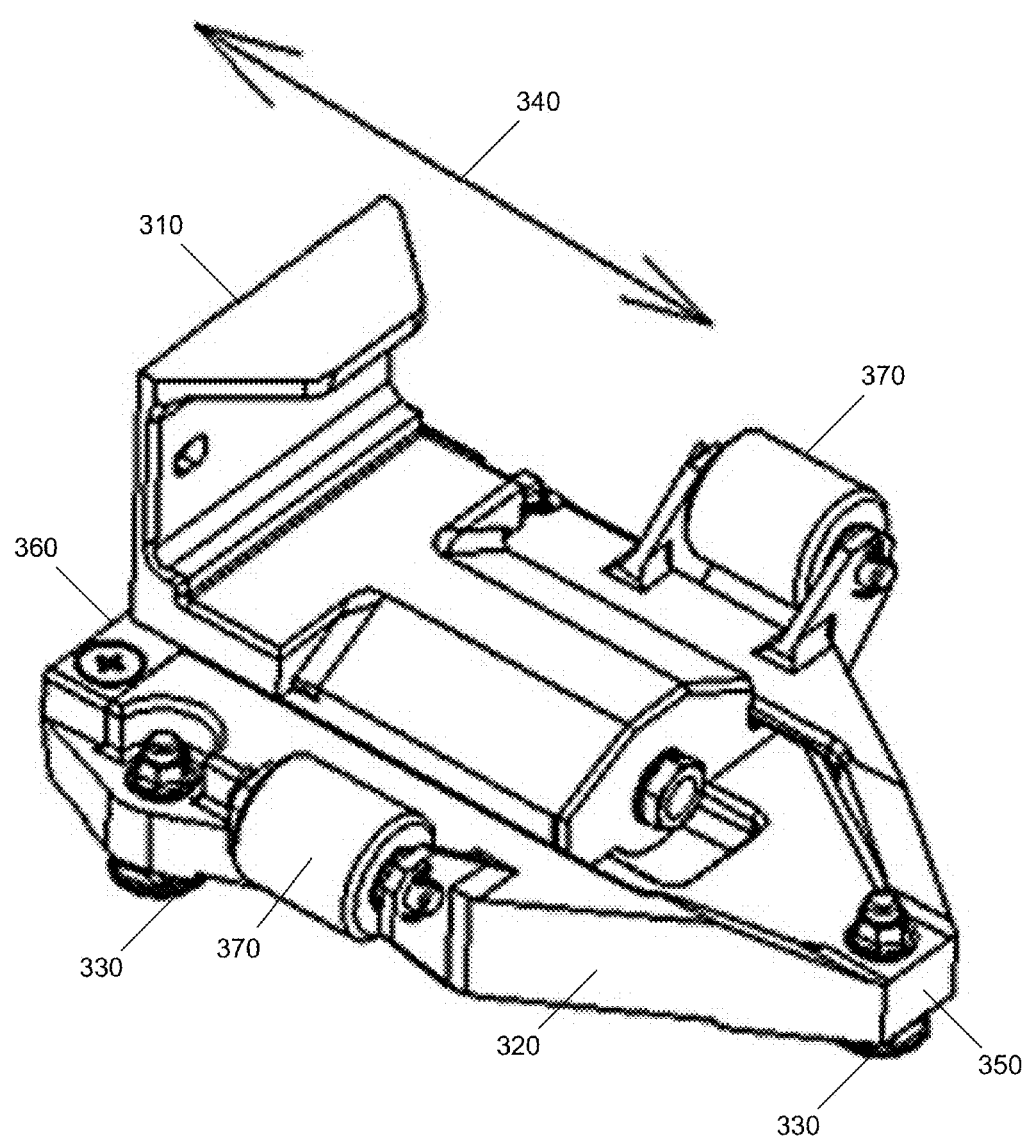
FIG. 3 provides an isometric view of the attenuating cargo restraint in accordance with some embodiments.

FIG. 3 provides an isometric view of the attenuating cargo restraint in accordance with some embodiments. The attenuating cargo restraint is comprised of a sliding head assembly 310, base 320, floor attachment hardware 330, and optional rollers 370.

In this figure, the attenuating cargo restraint is displayed at a default unbiased position. The head assembly 310 does however slide relative to the base 320 in the indicated direction 340, thereby allowing the head assembly 310 to continually engage a ULD when pinching or expansion of the deck to which the restraint is coupled distorts (e.g., pinches or expands) and causes the position of the base 320 to change. From the unbiased position, the head assembly 310 slides or otherwise biases outboard from the proximal end of the base 320 (as indicated by 350) to the distal end of the base 320 (as indicated by 360). The outboard biasing causes the distal end of the head assembly 310 to extend outboard beyond the distal end of the base 320. In some embodiments, the unbiased position of the cargo restraint device is the "inboardmost" position for the head assembly 310 (i.e., the head assembly 310 cannot move inboard relative to the base 320 from the unbiased position). In some other embodiments, the cargo restraint device is configured to allow the head assembly 310 to slide or otherwise bias inboard as well as outboard from the unbiased position. An elastic element housed within an inner cavity of the device (illustrated in FIGS. 4 and 6) causes the head assembly 310 to slide back to the unbiased position when distortion forces affecting the position of the base 320 are removed or are sufficiently reduced. FIGS. 10 and 11 further depict the biasing of the head assembly 310 relative to the base 320.

The rollers 370 are optionally attached to the sides of the attenuating cargo restraint. Each roller is a wheel or circular structure that rotates about its center axis. The rollers 370 reduce the force that is required to move a ULD into engagement with the head assembly 310.

From this isometric view, it is immediately obvious how the attenuating cargo restraint of FIG. 3 differs from other attenuating cargo restraints of the prior art. Rather than house the elastic element of the restraint in an outboard extension that is behind the head assembly, the attenuating cargo restraint of FIG. 3 incorporates the elastic element in front and below the point at which the head assembly restrains cargo. In so doing, the elastic element is located beneath a restrained ULD, thereby minimizing the footprint of the attenuating cargo restraint in the outboard direction relative to the cargo being restrained. As a result, the device set forth herein can be mounted within the plan-view envelope of the ULD being restrained, eliminating the need for a buffer or clearance behind the head assembly 310 or distal end of the base 320 that is more than the maximum amount of biasing provided by the restraint. This design optimally adapts the restraint for use in aircraft with constrained outboard specifications or limited spacing between the coupling location of the restraint and an outer sidewall of the cargo compartment.

Figure 4:
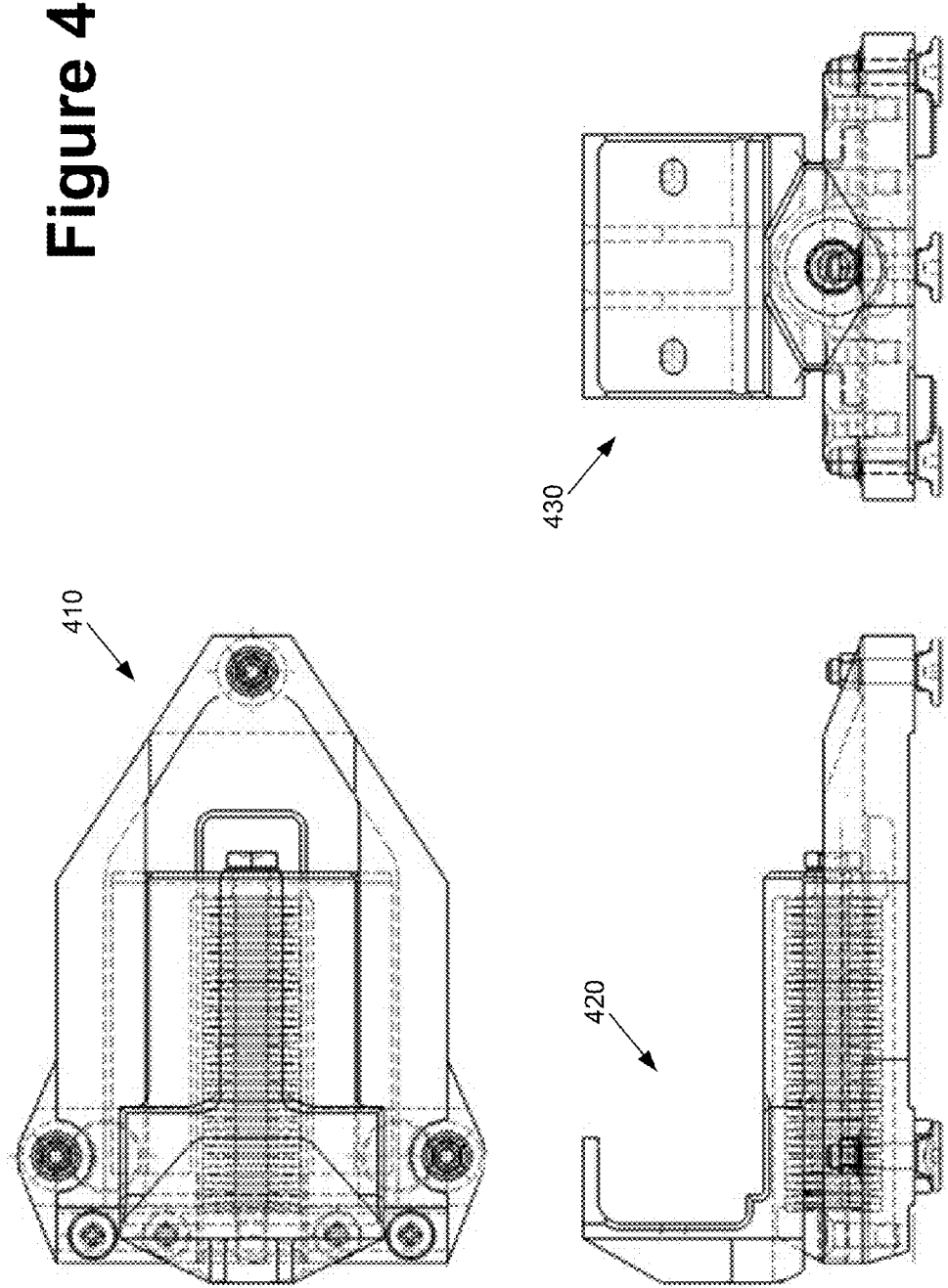
FIG. 4 provides a transparent top view, a transparent side view, and a transparent front view of the attenuating cargo restraint device in accordance with some embodiments.
Figure 5:
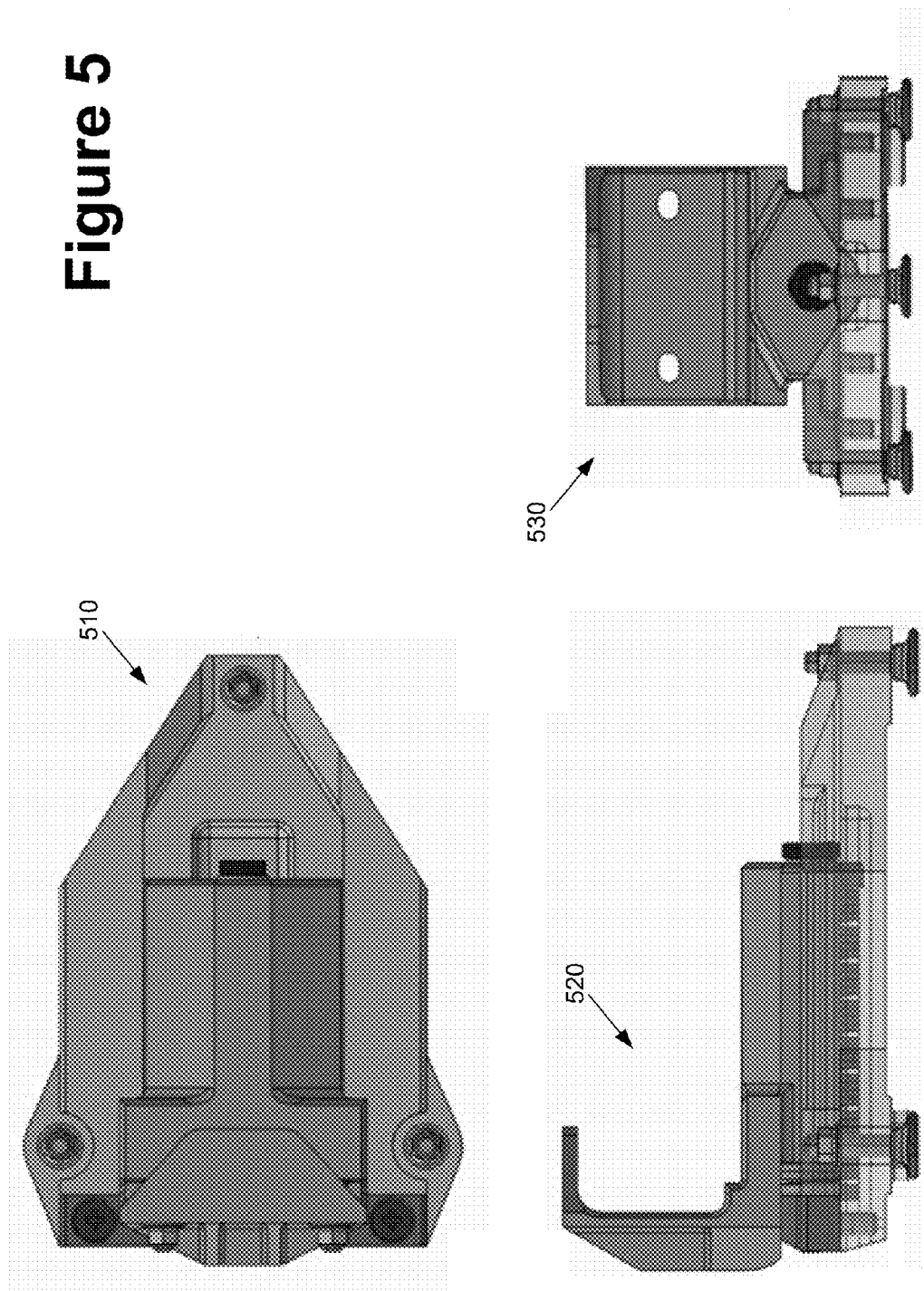
FIG. 5 provides a shaded top view, a shaded side view, and a shaded front view of the attenuating cargo restraint device in accordance with some embodiments.

Other views of the attenuating cargo restraint device are provided in FIGS. 4 and 5. Specifically, FIG. 4 provides a transparent top view 410, a transparent side view 420, and a transparent front view 430 of the attenuating cargo restraint device in accordance with some embodiments. FIG. 5 provides a shaded top view 510, a shaded side view 520, and a shaded front view 530 of the attenuating cargo restraint device in accordance with some embodiments.

Figure 6:
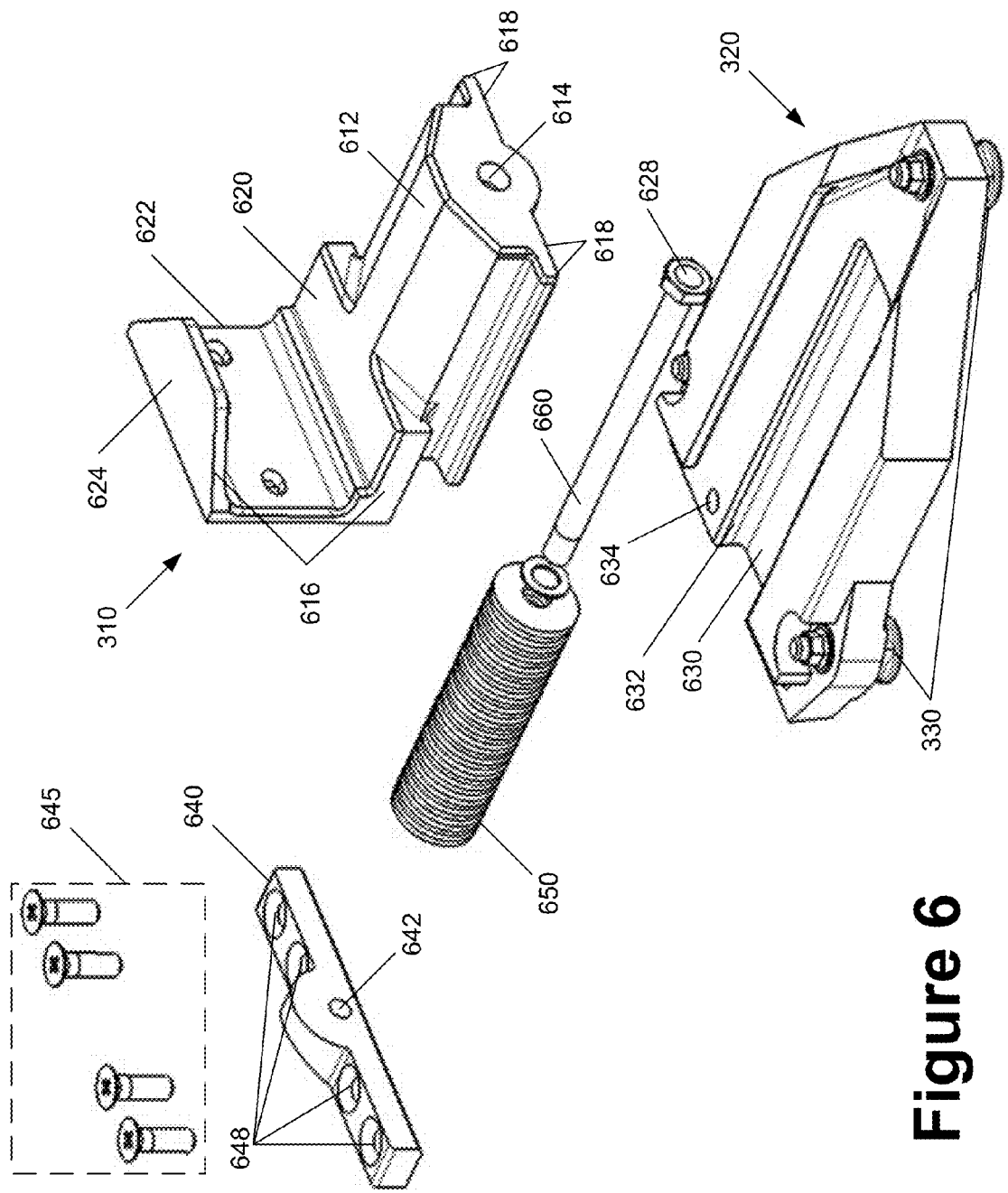
FIG. 6 provides an exploded view to detail the structure of the attenuating cargo restraint in accordance with some embodiments.

Further detail regarding the structure of the attenuating cargo restraint is provided with reference to the exploded view of the device that is depicted in FIG. 6. FIG. 6 illustrates the head assembly 310, base 320, floor attachment hardware 330, anchor 640, anchor screws 645, elastic element 650, and rod 660 as separate components that collectively form the attenuating cargo restraint device of some embodiments.

B. Head Assembly

The head assembly 310 includes upper housing 612, upper housing aperture 614, and slide channel 616. FIG. 7 provides a top view 710, a side view 720, and a front view 730 of the head assembly 310 in accordance with some embodiments.

The upper housing 612 is a multi-faceted protective covering. In some embodiments, the covering of the upper housing 612 forms a hollowed semi-circular cavity that accommodates an upper portion of the elastic element 650 and the rod 660 without contacting said structures and one or more upward facing facets of the covering serve as a platform atop which cargo can be situated. The cavity is used to accommodate an elastic element 650 that is circular in shape such as a spring or coil. In other embodiments, the upper housing 612 is a hollowed cavity of a different shape (e.g., rectangular, conical, irregular, etc.) that can accommodate other elastic elements or different shaped elastic elements. A complimentary inverted cavity is located in the base 320 to accommodate and incorporate a lower portion of the elastic element 650 and the rod 660. The collective cavities of the upper housing 612 and base 320 contain the elastic element 650 and the rod 660 wholly within the innards of the attenuating cargo restraint device and below the ULD being restrained. As noted above, this design minimizes the footprint of the device. Unlike attenuating cargo restraints of the prior art, the presented design does not extend behind or outboard the point at which the ULD engages the restraint.

The upper housing aperture 614 is a hole that guides the outboard and inboard biasing of the head assembly 310 along the rod 660. In some embodiments, the outboard face of the upper housing aperture 614 at the distal end of the head assembly 310 is open, thereby allowing outboard biasing of the head assembly to extend beyond the distal end of the base 320. The diameter of the upper housing aperture 614 is larger than the diameter of the shaft of the rod 660 such that the upper housing 612 can slide inboard and outboard along the shaft of the rod 660. However, the proximal end 628 of the rod 660 is enlarged to form a stop cap that is larger in diameter than the diameter of the aperture 614. The stop cap creates a first stop that determines the maximum inboard biasing of the head assembly 310 relative to the base 320. Stated differently, the proximal enlarged end 628 of the rod 660 is a governor regulating the inboard displacement of the head assembly 310. A nut can be screwed on or welded to the proximal end 628 to create the stop cap.

At either lateral end of the upper housing 612 are protruding ridges 618 that extend longitudinally from the distal end to the proximal end of the upper housing 612. The ridges 618 are best seen from the top view 710 and the front view 730 of the head assembly as presented in FIG. 7. These protruding ridges 618 form the tongue for the tongue-and-groove joint across which the head assembly 310 slides relative to the base 320. More specifically, the ridges 618 fit in grooves that are located along the interior lateral walls of the base 320.

Atop the distal end (i.e., "outboardmost" end) of the upper house 612 is the slide channel 616. The slide channel 616 is the restraint feature that engages a ULD and prevents the ULD from movement. The slide channel 616 is a "C" shaped channel that includes a bottom ledge 620, a heel 622, and an upper flange 624. In some embodiment, the heel 622 is 1.5 inches in height, though the height of the heel 622 can be increased or decreased in order to accommodate different sized ULDs. In some embodiments, the upper flange 624 is between 2.7 inches in width, though the width of the upper flange 622 can be increased or decreased in order to accommodate different sized ULDs.

The attenuating cargo restraint engages a ULD when the ULD is slid in between the bottom ledge 620 and the upper flange 624 of the slide channel 616. Once the ULD is in this engaged position, the ULD rests atop the bottom ledge 620 and along the upward facing facets of the upper housing 612. The heel 622 prevents the ULD from sideways displacement and the upper flange 624 prevents the ULD from upward displacement. In some embodiments, the heel 622 includes one or more holes that may be used to couple the head assembly 310 to a rail via one or more nuts and bolts.

In some embodiments, the height of the head assembly 310 is approximately 3 inches and the width of the head assembly 310 including the protruding ridges 618 is approximately 3 inches. However, different embodiments may increase or decrease the height and width of the head assembly to incorporate different sized ULDs and to house different sized elastic elements and rods. The head assembly is preferably formed of metal or a metal alloy, though any rigid material capable of withstanding specified forces can be used.

C. Base

Figure 8:
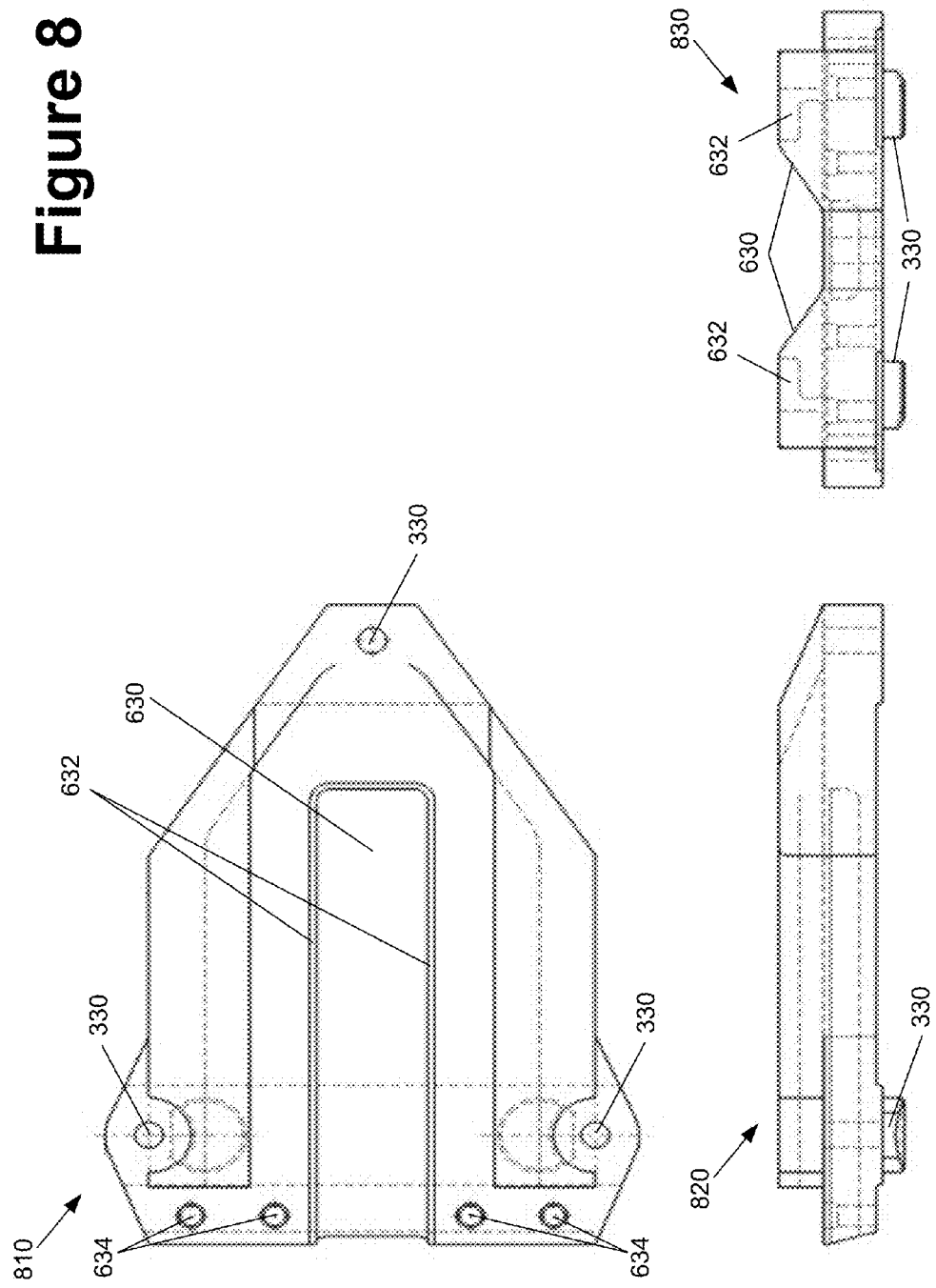
FIG. 8 provides a top view, side view, and front view of the base in accordance with some embodiments.

With reference to FIG. 6, the base 320 includes inner cavity 630, groove channels 632, threaded holes 634, and floor mounting hardware 330. FIG. 8 presents a top view 810, a side view 820, and a front view 830 of the base 320 in accordance with some embodiments.

The inner cavity 630 serves as the complimentary lower housing to the head assembly's 310 upper housing 612. The collective cavities incorporate the elastic element 650 and the rod 660 into the innards of the attenuating cargo restraint and inboard from where the head assembly engages the cargo being restrained. In some embodiments, the inner cavity 630 is semi-circular in shape to accommodate the elastic element 650 and the rod 660 when the elastic element 650 is a spring, coil, or other compressible article that is circular in shape. In other embodiments, the inner cavity 630 is of a different shape (e.g., rectangular, conical, irregular, etc.) to accommodate an elastic element 650 that is not circular in shape. In any shape, the inner cavity 630 is designed so as to not contact the elastic element 650 and rod 660 during movement of the head assembly 310 or while the head assembly 310 is in the unbiased state. The inner cavity 630 along with the head assembly 310 upper housing 612 differentiate the design with those of the prior art. Specifically, these cavities allow the elastic element 650 of the restraint to be placed below the cargo being restrained and inboard from the slide channel 616 of the head assembly 624 engaging the cargo.

The groove channels 632 are located along either sidewall of the inner cavity 630. The groove channels 632 are slits extending from the proximal end to the distal end of the inner cavity 630 sidewalls. The slits are indentations or recesses into the sidewalls. These slits offer the groove for the tongue-and-groove joint that moveably couples the head assembly 310 to the base 320. More specifically, the groove channels 632 are of sufficient depth and of proper height along the inner wall to accept the ridges 618 of the head assembly 310. Once the tongue-and-groove joint is formed by inserting the ridges 618 of the head assembly 310 to groove channels 632, the head assembly 310 is able to slide relative to the base 320 in the direction indicated by reference marker 340 of FIG. 3. In some embodiments, the inner cavity 630 is approximately one inch in height and 2.7 inches wide, though these dimensions can be adapted to accommodate different sized head assemblies.

The threaded holes 634 are the mounting points for the anchor screws 645 that secure the anchor 640 to the base. The function of the anchor 640 is described in the section below.

The floor mounting hardware 330 differs depending on usage of the restraint and where the restraint is to be mounted. In some embodiments, when the attenuating cargo restraint is used within the cargo compartment of aircraft that utilize a seat track system, the floor mounting hardware 330 includes studs that fit within the open fittings of the seat track system and that can be secured within the closed fittings of the seat track system. As shown in FIGS. 3 and 8, the floor mounting hardware 330 is a set of three rounded seat track studs with a first stud that is located at the center of the proximal end 350 of the base 320 and second and third studs are located at opposing sides towards the distal end 360 of the base 320. FIG. 9 illustrates mounting the attenuating cargo restraint along a seat track using studs as the floor mounting hardware 330. It should however be apparent to one of ordinary skill in the art that the attenuating cargo restraint is not limited to such usage or to cargo compartments that utilize the seat track system. Rather, the floor mounting hardware 330 can include any other mounting hardware to couple and decouple the restraint to a cargo compartment of any transport vehicle (e.g., rail, truck, ship, etc.). Accordingly, it is envisioned that the floor mounting hardware 330 can include a nut and bolt assembly, screws, latches, pins, and other forms of mounting hardware.

D. Anchor

With reference to FIG. 6, the anchor 640 includes aperture 642 and screw holes 648. The anchor screws 645 pass through the screw holes 648 and are screwed into the threaded holes 634 of the base 320 to secure the position of the anchor 640.

In some embodiments, the distal end of the rod 660 is welded, bolted, screwed in, or otherwise secured within the aperture 642 of the anchor 640. In some such embodiments, the position of the rod 660 is fixed. The length of the rod 660 is greater than the length of the upper housing 612 of the head assembly 310. This additional length allows for inboard and outboard biasing of the head assembly 310 relative to the base 320, wherein the head assembly 310 can slide inboard up to the point whereby the proximal end of the head assembly 310 abuts the stop cap at the proximal end 628 of the rod 660, and wherein the head assembly 310 can slide outboard up to the point whereby the head assembly 310 maximally compresses the elastic element 650 against the anchor 640.

Specifically, when the base 320 moves inboard or when the head assembly 310 moves outboard, the proximal end of the head assembly 310 contacts the elastic element 650. Should the inboard displacement of the base 320 or outboard displacement of the head assembly 310 produce sufficient force, the head assembly 310 will continue to push against the elastic element 650 until the force overcomes the inherent counter-force of the elastic element 650, resulting in compression of the elastic element 650, and biasing of the head assembly 310 relative to the base 320. The elastic element 650 will continue to exert the counter-force such that when the force of the displacement subsides, the elastic element 650 decompresses, returning the head assembly 310 to the unbiased position relative to the base 320. The maximum outboard distance the head assembly 310 can be biased is determined based on the compression parameters of the elastic element 650, though it is preferable to allow from 0.25 to 1 inch of biasing.

FIGS. 10 and 11 illustrate the attenuation or biasing of the head assembly 310 relative to the base 320 from a top view and a side view in accordance with some embodiments. Specifically, FIG. 10 illustrates the attenuating cargo restraint at an unbiased position from the top view and the side view. In this figure, the proximal end 1010 of the head assembly 310 abuts the stop cap at the proximal end 628 of the rod 660 to establish the unbiased position. FIG. 11 illustrates the head assembly 310 of FIG. 10 being biased in the outboard direction. The outboard biasing of the head assembly 310 is evidenced by the proximal end 1010 of the head assembly 310 having moved away from the stop cap at the proximal end 628 of the rod 660 by the distance 1110. This outboard biasing occurs when there is an outboard force placed on the slide channel 616 of the head assembly 310 or when there is an inboard force placed on the base 320 as a result of pinching to a cargo compartment deck to which the base 320 is mounted as an example. As seen in FIG. 11, the biasing of the head assembly 310 compresses the elastic element and displaces the head assembly 310 some distance behind the distal end of the base 320. As a result, the distal end of the head assembly 310 may extend outboard beyond the distal end of the base 320.

In some embodiments, the unbiased position or default position for the head assembly 310 is at the proximal end 628 of the rod 660 with the proximal end of the head assembly 310 abutting the stop cap at the proximal end 628 of the rod 660. In some such embodiments, the head assembly 310 can only be biased in the outboard direction from the unbiased position.

In some other embodiments, the unbiased position or default position for the head assembly 310 is some distance outboard from the proximal end 628 of the rod 660 such that the head assembly 310 can bias in either the inboard and outboard directions. This configuration is possible because most elastic elements will exert forces to counter either compression or extension of the elastic element. As a specific example, when the elastic element 650 is a spring and the spring is compressed, the inherent properties of the spring will produce a counter-force to the compression returning the spring to an unbiased state when the compression forces are sufficiently reduced. Similarly, when the spring is extended, the inherent properties of the spring will produce a counter-force to the extension returning the spring to the unbiased state when the extension forces are sufficiently reduced to no longer overcome the counter-force of the spring.

E. Elastic Element and Rod

The elastic element 650 can be any of a spring, coil, or other compressible material. In some embodiments, it is preferable to use a Belleville spring for the elastic element 650, although any torsion spring, leaf spring, coil spring, volute spring, or other spring or coil can also be used. When other compressible materials such as Urethane foam are used for the elastic element 650, the rod 660 may become an optional or unnecessary component.

The elastic element 650 is one that provides (1) a desired amount (i.e., distance) of compression and/or extension (i.e., biasing) and (2) a desired amount of counter-force to compression and/or extension. These properties are determined based on the size of the elastic element 650 and the spring constant among other properties of the elastic element 650. These properties are determined based in part on the transport vehicle or cargo compartment in which the attenuating cargo restraint of some embodiments is to be mounted and used to restrain cargo. Specifically, transport vehicles or cargo compartments are subject to different loads and forces that can lead to differing amounts of distortion to the deck of the cargo compartment to which the attenuating cargo restraint is mounted. Also, transport vehicles or cargo compartments are manufactured with different materials, different designs, and different tolerances all of which can affect the properties for the elastic element 650 of the attenuating cargo restraint of some embodiments.

Furthermore, the elastic element 650 must be of a size that fits within the cavities formed by the upper housing 612 of the head assembly 310 and the inner cavity 630 of the base 320. In some embodiments, the cavities collectively are approximately 2.7 inches wide and 4 inches in length, although these dimensions can vary when the size of the attenuating cargo restraint is altered for usage in different transport vehicles and different cargo compartments.

The rod 660 is made of a rigid material, preferably a solid metal shaft. Steel, hardened plastic, aluminum, and various other rigid materials can be used for the rod 660. The rod 660 may be lubricated around the outside to reduce friction when the head assembly slides along the rod 660. The length of rod 660 is determined based on the maximum amount of bias that is desired for the head assembly. For instance, if 0.5 inches of biasing is desired and the head assembly is 4 inches, then the shaft of the rod 660 will be 4.5 inches without including the enlarged proximal end.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A cargo restraint comprising:
   a base comprising a first sidewall and a second opposing sidewall extending from a distal end to a proximal end of the base, the first sidewall separated from the second opposing sidewall by a specified distance to form a first cavity centrally disposed in said base;
   a head assembly movably disposed relative to the base to permit biasing of the head assembly in response to displacement of at least one of the head assembly and the base, the head assembly comprising (i) a flange at a distal end of the head assembly configured to restrain cargo and (ii) a hollowed housing extending below said flange to a proximal end of the head assembly, the hollowed housing covering a second cavity that is inverted and substantially aligned relative to the first cavity of the base, wherein the distal end of the head assembly is substantially aligned with the distal end of the base at an unbiased state of the cargo restraint; and
   an elastic element located within the first and second cavities, the elastic element for absorbing biasing of the head assembly relative to the base and for providing a counter-force against said biasing to return the restraint to the unbiased state.

2. The cargo restraint of claim 1, wherein the base further comprises a recessed slit that extends from the distal end to the proximal end of the base along the first sidewall and the second sidewall, wherein the head assembly further comprises protruding ridges that extend a specified distance from each lateral side of the head assembly, said recessed slits accepting the protruding ridges of the head assembly to form a tongue-and-groove joint along which the head assembly slides relative to the base.

3. The cargo restraint of claim 1, wherein the cargo being restrained is positioned atop the hollowed housing of the head assembly.

4. The cargo restraint of claim 1 further comprising a roller rotatably disposed at a lateral side of the base.

5. The cargo restraint of claim 1, wherein the hollowed housing comprises an aperture at the proximal end along an inboard facing side of the head assembly.

6. The cargo restraint of claim 5 further comprising a rod, the rod comprising a distal end that is secured to the distal end of the base, a shaft extending from the rod distal end and passing through the elastic element within the cavities and the aperture, and a stop cap at a proximal end of the rod, the stop cap having a diameter larger than the aperture to establish a first stop against inboard biasing of the head assembly relative to the base.

7. The cargo restraint of claim 1, wherein the hollowed housing further comprises an inboard face at the proximal end of the head assembly, and the inboard face compressing the elastic element when the head assembly is biased outboard relative to the base.

8. The cargo restraint of claim 1, wherein the base further comprises an anchor against which the elastic element compresses when the head assembly is biased outboard relative to the base.

9. The cargo restraint of claim 1, wherein the base further comprises mounting hardware for coupling the restraint to a deck of a cargo compartment.

10. The cargo restraint of claim 9, wherein the mounting hardware comprises a set of seat track studs.

11. The cargo restraint of claim 1, wherein the elastic element comprises at least one of a spring, coil, or compressible Urethane material.

12. The cargo restraint of claim 1, wherein the elastic element further comprises at least one of a Bellville spring, torsion spring, leaf spring, coil spring, and volute spring.

13. An aircraft cargo restraint for restraining cargo during transport, the restraint comprising:
- a base comprising a hollowed body with a first cavity centrally disposed from an outboard end of the base to substantially an inboard end of the base;
- a head assembly moveably coupled to the base with the head assembly establishing a default unbiased position that aligns an outboard end of the head assembly with the outboard end of the base, wherein the head assembly is configured to at least bias outboard relative to the base with the outboard end of the head assembly extending outboard beyond the outboard end of the base, the head assembly comprising:
  - (i) a flange at the outboard end of the head assembly that is positioned upward and inboard to restrain the cargo, and
  - (ii) a covering extending to an inboard end of the head assembly to provide a platform atop which cargo is situated, the covering surrounding a second cavity below the platform that is aligned with the first cavity; and
- an elastic element located within the first and second cavities, the elastic element compressing when the head assembly is biased outboard relative to the base and providing a counter-force to the compression to facilitate the return of the head assembly to the default unbiased position.

14. The aircraft cargo restraint of claim 13, wherein the head assembly is further configured to bias inboard relative to the base.

15. The aircraft cargo restraint of claim 14, wherein the elastic element extends when the head assembly is biased inboard relative to the base, said elastic element further providing a counter-force to the extension to facilitate the return of the head assembly to the default unbiased position.

16. The aircraft cargo restraint of claim 13 further comprising a roller rotatably disposed at a lateral side of the base.

17. The aircraft cargo restraint of claim 13, wherein the elastic element is located below a plane of the platform atop which cargo is restrained.

18. The aircraft cargo restraint of claim 13, wherein an outboard end of the elastic element is substantially aligned with a point at which the flange restrains cargo and an inboard end of the elastic element is inboard from the point at which the flange restrains cargo.

19. The aircraft cargo restraint of claim 13, wherein the elastic element comprises at least one of a spring, coil, or compressible Urethane material.

* * * * *